(12) United States Patent
    Reichert

(10) Patent No.: US 8,839,132 B2
(45) Date of Patent: Sep. 16, 2014

(54) METHOD AND SYSTEM FOR PROVIDING VISUAL INSTRUCTIONS TO WAREHOUSE OPERATORS

(75) Inventor: John Paul Reichert, Greenfield Park (CA)

(73) Assignee: Tecsys, Inc., Quebec (CA)

( * ) Notice: Subject to any disclaimer, the term of this patent is extended or adjusted under 35 U.S.C. 154(b) by 262 days.

(21) Appl. No.: 12/959,120

(22) Filed: Dec. 2, 2010

(65) Prior Publication Data
    US 2012/0144334 A1      Jun. 7, 2012

(51) Int. Cl.
    *G06F 3/0481*      (2013.01)
    *G06Q 10/08*       (2012.01)

(52) U.S. Cl.
    CPC ..................... *G06Q 10/087* (2013.01)
    USPC ........... 715/771; 715/734; 715/735; 715/764; 345/427; 345/419

(58) Field of Classification Search
    USPC ......................................................... 715/771
    See application file for complete search history.

(56) References Cited

U.S. PATENT DOCUMENTS

| | | | | |
|---|---|---|---|---|
| 5,917,499 A * | 6/1999 | Jancke et al. | ................. | 345/440 |
| 6,115,485 A * | 9/2000 | Dumoulin et al. | ............. | 382/128 |
| 6,744,436 B1 * | 6/2004 | Chirieleison et al. | ......... | 345/427 |
| 6,993,533 B1 * | 1/2006 | Barnes | ................... | 1/1 |
| 7,082,400 B2 * | 7/2006 | Jones et al. | ........................ | 705/6 |
| 7,082,575 B2 * | 7/2006 | Lin et al. | ........................ | 715/771 |
| 7,124,357 B1 * | 10/2006 | Orr | ................................ | 715/234 |
| 7,243,001 B2 * | 7/2007 | Janert et al. | .................... | 700/214 |
| 7,657,467 B2 * | 2/2010 | Deganis et al. | .................. | 705/28 |
| 7,721,212 B2 * | 5/2010 | Alfandary et al. | ............ | 715/735 |
| 7,877,280 B2 * | 1/2011 | Jones et al. | ........................ | 705/6 |
| 8,014,946 B2 * | 9/2011 | Rasmussen et al. | .......... | 701/439 |
| 8,213,737 B2 * | 7/2012 | Steinberg et al. | ............. | 382/275 |
| 8,275,449 B2 * | 9/2012 | White et al. | ................... | 600/431 |
| 8,296,063 B1 * | 10/2012 | Baillot | ........................... | 701/434 |
| 8,306,272 B2 * | 11/2012 | Reinpoldt, III | ............... | 382/106 |
| 2002/0156661 A1 * | 10/2002 | Jones et al. | ........................ | 705/6 |
| 2003/0172200 A1 * | 9/2003 | Chen et al. | ......................... | 710/3 |
| 2003/0212670 A1 * | 11/2003 | Yalamanchi et al. | ............. | 707/3 |
| 2004/0015819 A1 * | 1/2004 | Romano-Critchley et al. | .............................. | 717/102 |
| 2005/0187991 A1 * | 8/2005 | Wilms et al. | ................... | 707/204 |
| 2005/0222996 A1 * | 10/2005 | Yalamanchi | ........................ | 707/4 |
| 2005/0240615 A1 * | 10/2005 | Barsness et al. | .............. | 707/102 |
| 2006/0218194 A1 * | 9/2006 | Yalamanchi | ............... | 707/104.1 |
| 2007/0011034 A1 * | 1/2007 | Jones et al. | ........................ | 705/6 |
| 2007/0239508 A1 * | 10/2007 | Fazal et al. | ........................ | 705/8 |
| 2007/0239769 A1 * | 10/2007 | Fazal et al. | .................... | 707/102 |
| 2009/0024944 A1 * | 1/2009 | Louch et al. | .................. | 715/765 |

(Continued)

*Primary Examiner* — William Bashore
*Assistant Examiner* — Reza Nabi
(74) *Attorney, Agent, or Firm* — Kilpatrick Townsend & Stockton LLP

(57) ABSTRACT

A method in a warehouse management system for providing instructions to a user, comprising: receiving a table in a database of the warehouse management system, the table defining the instructions, one or more of the columns of the table containing data and image references pertaining to respective warehouse storage items associated with the instructions; adding an expression column to the table, the expression column for defining a combination of the data and image references pertaining to the respective warehouse storage items in accordance with the instructions; adding markup language code to the expression column for customizing a graphical presentation of the combination; generating the graphical presentation of the combination from the markup language code; and, displaying the graphical presentation on a display screen of the warehouse management system, thereby providing the instructions to the user in a graphical format.

29 Claims, 11 Drawing Sheets

(56) References Cited

U.S. PATENT DOCUMENTS

| | | |
|---|---|---|
| 2009/0048947 A1* | 2/2009 | Chorley et al. ............ 705/28 |
| 2009/0070353 A1* | 3/2009 | Chorley et al. ............ 707/101 |
| 2009/0199273 A1* | 8/2009 | Yalamanchi ............ 726/4 |
| 2009/0313544 A1* | 12/2009 | Wood et al. ............ 715/716 |
| 2010/0281788 A1* | 11/2010 | Thomas ............ 52/79.5 |
| 2010/0316470 A1* | 12/2010 | Lert et al. ............ 414/273 |
| 2010/0318207 A1* | 12/2010 | Yee et al. ............ 700/95 |
| 2011/0027053 A1* | 2/2011 | Freudelsperger ............ 414/273 |
| 2011/0246401 A1* | 10/2011 | Arora ............ 706/12 |
| 2012/0020576 A1* | 1/2012 | Fry et al. ............ 382/218 |
| 2012/0075071 A1* | 3/2012 | Liu et al. ............ 340/10.1 |

* cited by examiner

| Rendering Template | Style Sheet |
|---|---|
| `<span class="ImageBase"`<br>`<img src=`<br>`"{resource.user.base_url}/`<br>`wms/cnty_f/dynamic_image/`<br>`{value2}.jpg" alt=""/>`<br>`<span`<br>`class="ImageBaseOverlay">`<br>`<span style="color:blue">`<br>`{value3}`<br>`</span> x`<br>`<span style="color:green">`<br>`{value5}`<br>`</span>`<br>`</span>`<br>`</span>` | `.ImageBase {`<br>`  position: relative;`<br>`  width: 100%;`<br>`}`<br>`.ImageBaseOverlay {`<br>`  position: absolute;`<br>`  top: 22px;`<br>`  left: 35px;`<br>`  width: 100%;`<br>`  font: bold 150% Helvetica, Sans-Serif;`<br>`  background: rgb(0, 0, 0);`<br>`  padding: 5px;`<br>`}` |

| Type △ | Description | Dynamic Image | Transport | Permanent | External Width | External Depth | External Height |
|---|---|---|---|---|---|---|---|
| BOX3 | BOX3-LARGE BOX | 22 X 18 | No | No | 22.0 | 18.0 | 24.0 |
| BOX4 | BOX4-VERY LARGE BOX | 36 X 24 | No | No | 36.0 | 24.0 | 24.0 |
| CART | WAREHOUSE CART | 60 X 55 | Yes | Yes | 60.0 | 55.0 | 30.0 |
| PALL | SHIPPING PALLET | 48 X 78 | No | No | 48.0 | 78.0 | 40.0 |
| PALS | SMALL SHIPPING PALLET | 32 X 32 | No | No | 32.0 | 32.0 | 40.0 |

Fig. 8

METHOD AND SYSTEM FOR PROVIDING VISUAL INSTRUCTIONS TO WAREHOUSE OPERATORS

FIELD OF THE INVENTION

This invention relates to the field of warehouse management systems, and more specifically, to a method and system for providing visual (i.e., graphical) instructions to warehouse operators.

BACKGROUND OF THE INVENTION

A warehouse management system ("WMS") assists in the management of movement and storage of materials within a warehouse. It automates and centralizes the management of inventory levels, stock locations, material receiving, packing and shipping. A WMS is a key part of the supply chain and primarily aims to control the movement and storage of materials within a warehouse and process the associated transactions, including shipping, receiving, putaway and picking. These systems also direct and optimize stock putaway based on real-time information about the status of bin utilization. Warehouse management systems often utilize auto identification ("ID") data capture ("AIDC") technology, such as barcode scanners, mobile computers, wireless local area networks ("WLANs"), and potentially radio-frequency identification ("RFID") to efficiently monitor the flow of products. Once data has been collected, there is typically either a batch synchronization with, or a real-time wireless transmission to, a central database. The database can then provide useful reports about the status of goods in the warehouse.

The objective of a WMS is to provide a set of computerised procedures to handle the receipt of stock and returns into a warehouse facility, model and manage the logical representation of the physical storage facilities (e.g., racking etc), manage the stock within the facility, and enable a seamless link to order processing and logistics management in order to pick, pack, and ship product out of the facility. A WMS can be a stand alone system, or modules of an enterprise resource planning ("ERP") system or supply chain execution suite. The primary purpose of a WMS is to control the movement and storage of materials within a warehouse. As such, a WMS may be described as the legs at the end-of-the line which automates store, traffic, and shipping management. In its simplest form, a WMS can data track products during the production process and act as an interpreter and message buffer between existing ERP and WMS systems.

Today, concept of warehouse management is not limited to just managing within the boundaries of a warehouse, rather, it is much wider and extends beyond the physical boundaries of the warehouse. Inventory management, inventory planning, cost management, information technology ("IT") applications, and communication technology may all be related to warehouse management. In addition, item or container storage, loading, and unloading may also be covered by warehouse management. Warehouse management may be a part of supply chain management ("SCM") and demand management systems. Even production management is to a good extent dependent on warehouse management. Efficient warehouse management gives a cutting edge advantage to a retail chain distribution company. Warehouse management does not just start with receipt of material, rather, it may start with the initial planning of container design for a product or item. Warehouse design and process design within the warehouse (e.g., wave picking) may also be considered as a part of warehouse management. As such, warehouse management may be considered as a part of logistics and SCM applications. Warehouse management may include monitoring the progress of products through the warehouse. As such, it involves the physical warehouse infrastructure, tracking systems, and communication between product stations. Warehouse management may deal with receipt, storage, and movement of goods (i.e., normally finished goods) to intermediate storage locations or to final customers. In a multi-echelon model for distribution, there are levels of warehouses, starting with the central warehouse(s), regional warehouses serviced by the central warehouse, and retail warehouses at the third level serviced by the regional warehouses, and so on. The objective of warehouse management is to help in optimizing costs of timely order fulfillment by managing resources economically. Thus, warehouse management is equivalent to the management of storage of products and services rendered on the products within the walls of a warehouse.

One aspect of warehouse management relates to providing instructions to operators or personnel within the warehouse (e.g., for picking items). Existing warehouse management applications provide user task instructions through textual information. With these existing applications, the operator is required to read and interpret what is to be performed. This is problematic as it often provides challenges to operators relating to: literacy requirements for operators; language difficulties if an operator's mother language is not the displayed language; and, transposition of numerical data. In these existing warehouse management applications, product information, units of measure, location identifiers, etc., are generally in text form and small differences, particularly in long text strings, are not easily deciphered. Short text information also provides no contextual information relative to identification of the source for data collection. For example, on a label with multiple barcodes, which one is the correct one that represents the serial number for the item?

Solutions have been suggested to these problems. For example, in some warehouse management applications, textual instructions have been replaced with voice instructions similar to navigating through voice mail options on a telephone system. These applications tend to rely on voice commands and responses as an alternative to text messaging. While these applications have the advantage of freeing the operator's hands and eliminating some language and literacy issues, they also have drawbacks such as operator fatigue and concentration issues during long shifts. They also do not provide any visual clues with respect to the instructions to be performed.

A need therefore exists for an improved method and system for providing warehouse operators with instructions. Accordingly, a solution that addresses, at least in part, the above and other shortcomings is desired.

SUMMARY OF THE INVENTION

According to one aspect of the invention, there is provided a method in a warehouse management system for providing instructions to a user, comprising: receiving a table in a database of the warehouse management system, the table defining the instructions, one or more of the columns of the table containing data and image references pertaining to respective warehouse storage items associated with the instructions; adding an expression column to the table, the expression column for defining a combination of the data and image references pertaining to the respective warehouse storage items in accordance with the instructions; adding markup language code to the expression column for customizing a graphical presentation of the combination; generating the graphical presentation of the combination from the markup language code; and, displaying the graphical presentation on a display screen of the warehouse management system, thereby providing the instructions to the user in a graphical format.

In accordance with further aspects of the present invention there is provided an apparatus such as a data processing system or a wireless device, a method for adapting these, as well as articles of manufacture such as a computer readable medium or product having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which:

FIG. 7 is a table illustrating the display of width and depth of a box in different colours (e.g., blue and green) on top of an image in accordance with an embodiment of the invention;

FIG. 8 is a table illustrating various dynamic item or container images, classes, and data in accordance with an embodiment of the invention;

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems, wireless devices, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 1:
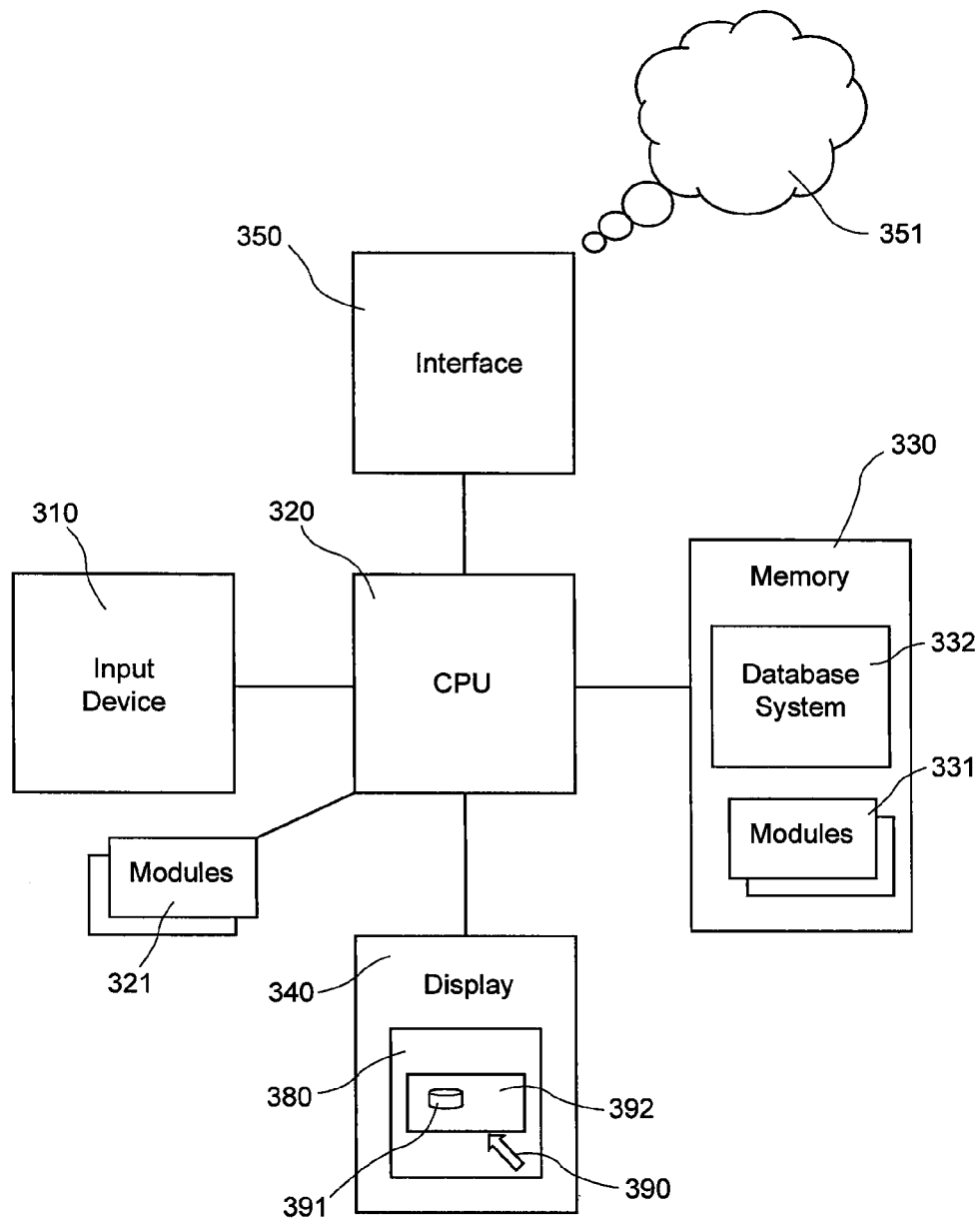
FIG. 1 is a block diagram illustrating a data processing system in accordance with an embodiment of the invention.

FIG. 1 is a block diagram illustrating a data processing system 300 in accordance with an embodiment of the invention. The data processing system 300 is suitable for generating, displaying, and adjusting presentations in conjunction with a graphical user interface ("GUI"), as described below. The data processing system 300 may be a client and/or server in a client/server system. For example, the data processing system 300 may be a server system or a personal computer ("PC") system. The data processing system 300 may also be a wireless device or other mobile, portable, or handheld device. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system and a database and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention.

The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

The desktop 160, wireless 161, other client devices (e.g., mobile devices, handheld devices, portable devices, personal digital assistants ("PDAs"), etc.) application server 162, BI server 163, DB servers 164, 165, directory server 166, and external system 167 described in the following may have a hardware configuration similar to the data processing system 300 described above. According to one embodiment, the functionality of each of these devices may be included in one or more data processing systems 300.

Figure 2:
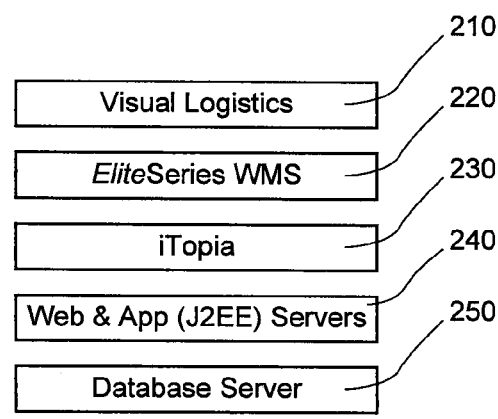
FIG. 2 is a block diagram illustrating software modules for generating visual instructions in accordance with an embodiment of the invention.

FIG. 2 is a block diagram illustrating software modules 331 for generating visual instructions in accordance with an embodiment of the invention. The software modules 331 include the following modules or applications: Visual Logistics™ 210; EliteSeries™ WMS 220; iTopia™ 230; Web & Application (J2EE) Servers 240; and, Database Server 250. The Visual Logistics application 210 is built from software services provided by the EliteSeries WMS application 220 which in turn uses the iTopia application or framework 230. The underlying software infrastructure uses industry-standard web and application server components 240 and commercial off-the-shelf ("COTS") databases 250.

The EliteSeries WMS application 220 implements warehouse business workflows via the iTopia application 230 capabilities provided through views, rules processing, extensions, and framework services. These capabilities can be re-configured via changes to metadata. They facilitate the selection of the image for display on an operators's device 161, 300 based on context which may include the step in the business workflow, the status of the item to be displayed, quantity and location, the graphics resolution of the display 340 of the device 161, 300, etc. The selected image is then retrieved from the image library (also managed by the iTopia appliation 230) and delivered to the device 161, 300 using a web server (e.g., 162 in FIG. 3) and underlying infrastructure.

The iTopia application 230 is designed specifically to meet the development needs of business application systems such as the EliteSeries WMS 220. The use of the iTopia application 230 allows applications developed using it to share the same behaviours, flow of control, look and feel, etc. It also allows these applications to share core functions such as access to persistence mechanisms (e.g., the database management system), internationalization, logging, messaging, user management, security features (e.g., authentication and authorization), etc. Along with these basic capabilities are other unique capabilities including those described in the following.

First, metadata is used to define the system. Metadata is defined for all of the data elements and includes attributes that define such things as an element's type (e.g., physical database column, multimedia artefact, derived by code extensions, SQL expressions, etc.), whether or not it is editable, what context it can be used in (e.g., criteria, search results, details, etc.), how it relates to other data elements, and what purpose it serves (e.g., as a timestamp, audit element, identity element, for application locks, to flag an entity as incomplete, to drive certain workflows, etc.).

Second, a personalization takes place of system elements that are displayed to and received from an end user of an external system (i.e., in the case of Web services or file imports/exports). For every interaction between an end user or external system and any application built on top of the iTopia application 230, the exchange of data and its functions is defined by an iTopia view. An iTopia view is a collection of data elements (i.e., defined in the metadata) used for a given context. Application contexts include searching for data, editing data, workflow definitions, etc.

Third, programmatic code extensions are Java™ classes containing business logic that applies to a specific business context, such as a particular table or field in a table. They complete the set of business rules to ensure that the validation rules are not compromised regardless of any view personalization that might be applied. For example, consider a rule where field A's value can only be a given range if field B's value is "1". One might have a personalized view that only includes field B and the user could then change that value to "2". The business rule that verifies field A's value will be checked anyway, and if it does not pass the validation rules, the change will be rejected. These programmatic code extensions maintain the integrity and consistency of the system data.

Fourth, workflows are defined in a manner that allows a user to "string" together a series of iTopia views into a basic workflow. For instance, one could start off with a criteria screen on iTopia view X that allows a user to enter criteria for the purpose of searching a record within the system. Upon selecting that record, the user would be directed to a record maintenance screen on iTopia view Y. Then, depending on the data that was provided here, the user would be directed to another record maintenance screen on an altogether different iTopia view (e.g., view Z). Programmatic code extensions are provided that allow a developer the ability to provide snippets of code that evaluate the conditions for the screen re-direction and other workflow functions such as special prompts, custom screens, etc.

Figure 3:
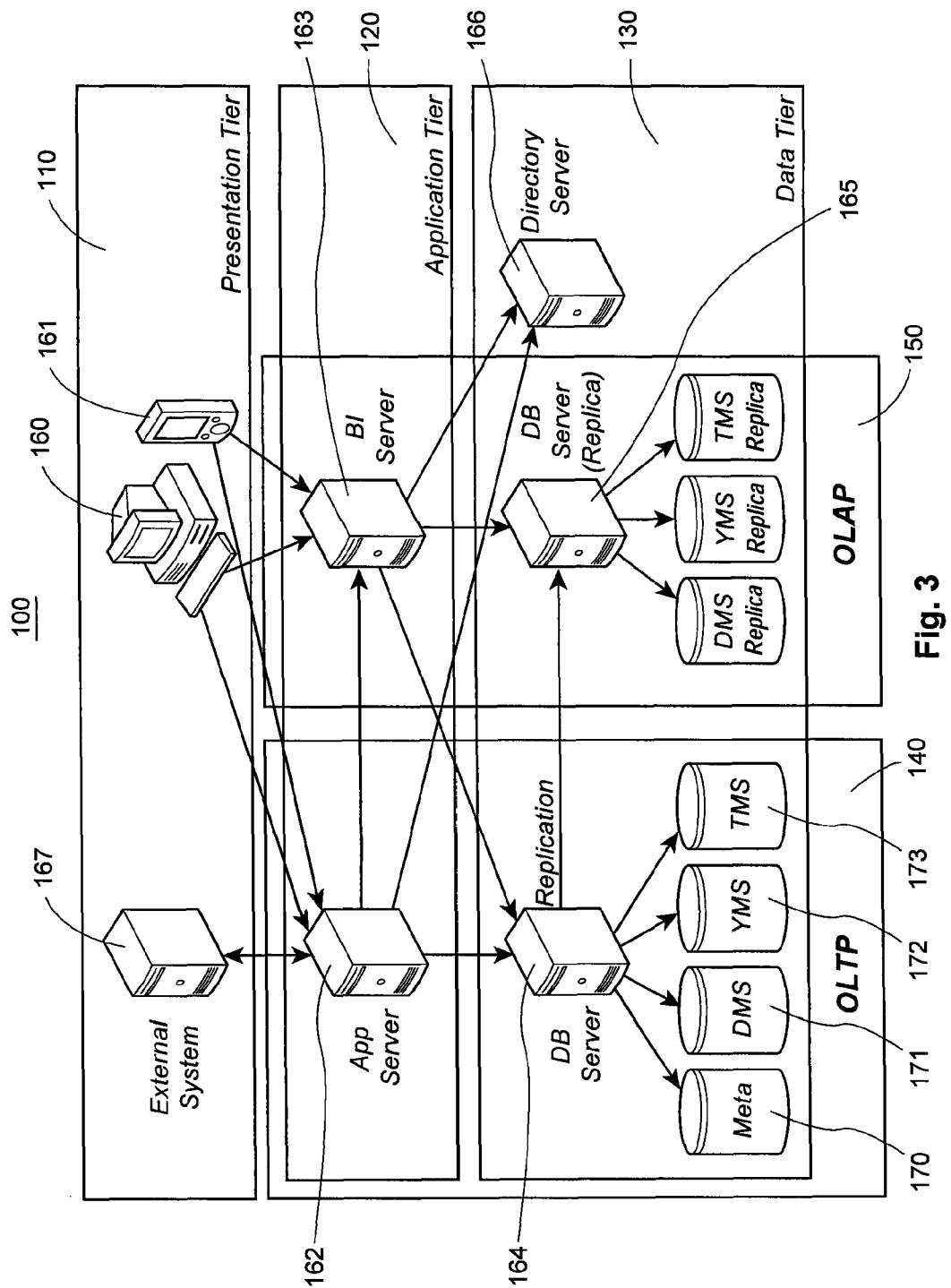
FIG. 3 is a block diagram illustrating an architecture for a warehouse management system application in accordance with an embodiment of the invention.

FIG. 3 is a block diagram illustrating an architecture 100 for a warehouse management system application 220 in accordance with an embodiment of the invention. The architecture 100 can be viewed from the following two perspectives. First, along the lines of domains that follow the classic three-tiered pattern which consists of: (a) a presentation tier 110 which handles the presentation of data. In a Web application, data is requested by the browser and is sent there from the Web server for display; (b) an application tier 120 which processes the business logic. Business logic consists of the set of rules for processing business information such as data validations rules, messaging, workflow, etc.; and, (c) a data tier 130 which essentially consists of the associated databases and files where data is stored. This includes the database management systems ("DBMS"), directory servers, and any other data persistence/retrieval mechanisms. Second, based on processing type: (a) online transaction processing ("OLTP") 140. OLTP 140 refers to a class of systems that facilitate and manage transaction-oriented applications, typically for day-to-day type operations such as data entry and retrieval. Examples include the setting up of master records, transaction entry processes such as order entry and purchasing, the recording of item movements, OIL updates, etc. The iTopia application 230 serves as the foundation for EliteSeries OLTP 140 applications; and, (b) online analytical processing ("OLAP") 150. OLAP 150 is an approach to quickly providing answers to analytical queries that are typically multidimensional in nature. The EliteSeries business intelligence ("BI") application is the application that's used for this purpose. According to one embodiment, the EliteSeries BI application may be a packaging of IBM™ Cognos™ 8 for EliteSeries.

The hardware and software modules or components of the architecture 100 may include the following. User interface ("UI") devices including desktops computers 160, wireless devices 161, and other client devices (e.g., PDAs, handheld devices, portable devices, etc.). Both the iTopia-based EliteSeries applications (e.g., 220) and EliteSeries BI are fully Web-based. As a result, all that a client device 160, 161 requires is a Web browser. An application server 162 which is the host for the EliteSeries applications (i.e., DMS, WMS 220, and TMS). It also hosts iTopia 230 which serves as framework and foundation for the EliteSeries applications. It is front ended by Web server software and may run JBoss™ (i.e., a freeware J2EE-compliant application server software product). Database access is accomplished via Java™ database connectivity (JDBC™). A BI server 163 is the host for the EliteSeries BI application. It is front ended by Web server software and may host Cognos™ software. Database access may be accomplished using the database vendor's client software. A database ("DB") server 164 is used for storing the operational data. Oracle™, Informix™, and SQL Server™ may be the supported relational database management system ("RDBMS") products. The EliteSeries application includes of the following database schemas: (a) "Meta" 170 which is iTopia's central database for storing metadata such as literals, data dictionary, business views, user management system ("UMS") data, and messaging queues; (b) "DMS" 171 for distribution management system data. (Not available for SQL Server); (c) "WMS" 172 for warehouse management system data. (Not available for SQL Server); and, (d) "TMS" 173 for transportation management system data. A DB server (replica) 165 may optionally be provided for the BI data. It may be a read-only replica of the operational data. It generally has to be from the same vendor (e.g., Oracle™, Informix™, SQL Server™) as the DB server 164 for the operational data. The advantage to deploying a second DB server 165 is so that resource-intensive BI queries do not affect the day-to-day operations from the OLTP 140. This will result in better overall performance for the mission critical operations which are part of the OLTP 140. Optionally, a different setup using a cluster of DBMS's may be. A directory server 166 is used to define the users that have access to the system 100. It is solely used for the purpose of authenticating users. Using a directory server 166 for this purpose provides one with a single source for authenticating users. Active Directory™ and the Sun Java System Directory Server™ may be used. An external system 167 defines any external system interfaces with EliteSeries 220. Examples include the following: (a) "TrackAbout Asset Management System" which is a system used by gas and welding companies for managing assets such as cylinders; and, (h) carrier systems such as UPS™, FedEx™, Purolator™, and others.

Figure 4:
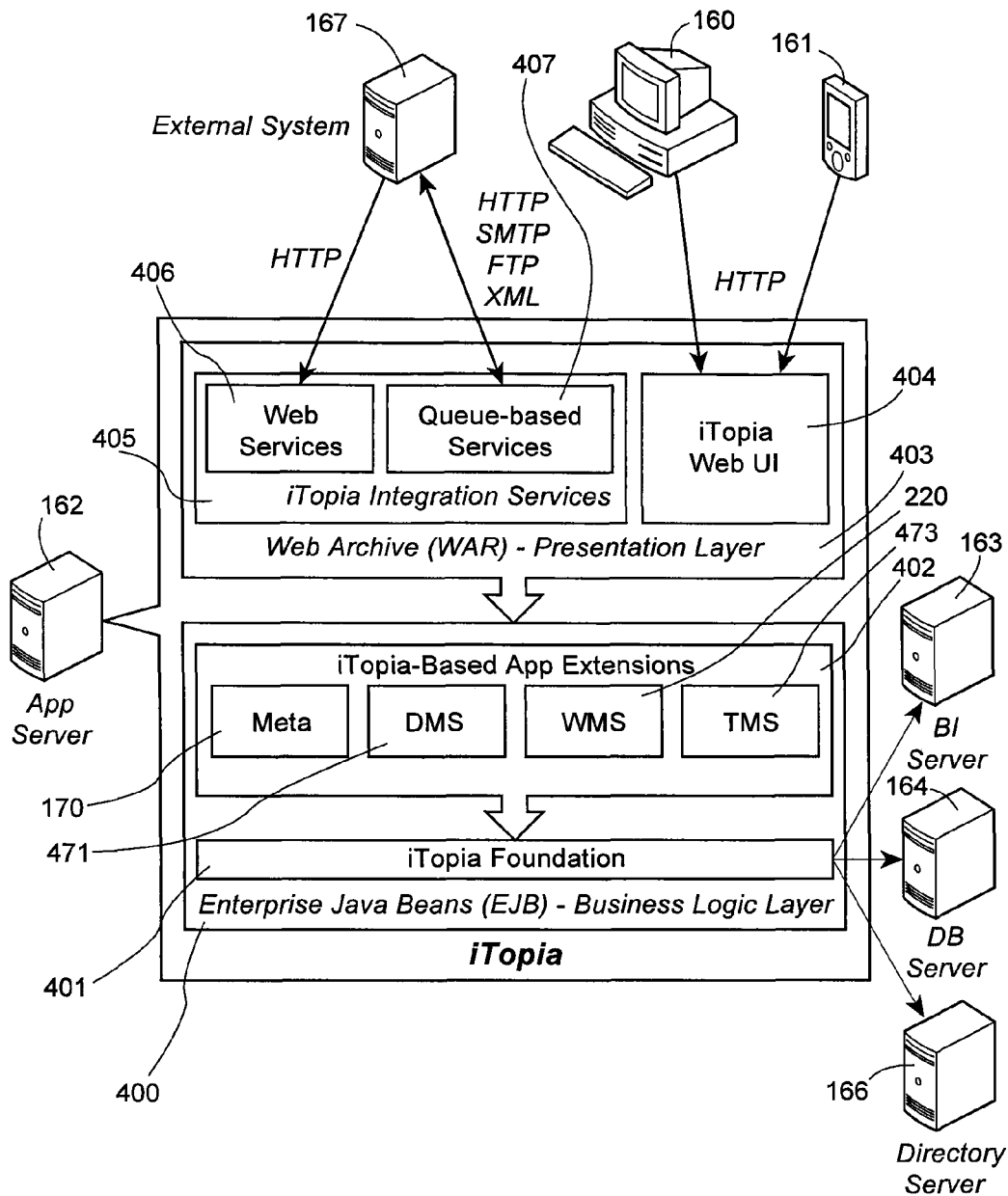
FIG. 4 is a block diagram illustrating an application server in accordance with an embodiment of the invention.

FIG. 4 is a block diagram illustrating an application server 162 in accordance with an embodiment of the invention. The core of EliteSeries 220 is the iTopia-based applications server 162 that is running within the OLTP 140. The EliteSeries distribution management system ("DMS") 471, warehouse management system ("WMS") 220 and transporation management system ("TMS") 473 applications execute on top of it. iTopia 230 is essentially a framework for the purpose of building end user applications and systems such as the DMS 171, WMS 220, and TMS 173. iTopia 230 along with the applications and systems that run on top of it are built to the Java™ 2 Enterprise Edition ("J2EE") standard. As such it can run across a variety of platforms such as Windows™, Linux™ and UNIX™.

The iTopia framework 230 provides a platform for rapid application development. A single implementation that can power hundreds of query and maintenance programs can be advantageous.

The iTopia framework 230 is metadata-driven, that is, a metadata definition describes the application database's schema in terms of the typical database constructs (e.g., tables, columns, data types, primary keys, foreign keys, etc.). The metadata informs iTopia 230 with respect to how to interact with the database, enabling it to query and update the data. It also goes beyond the typical scope of database metadata, allowing the definition of expression columns (whose values are calculated by a database query), extension columns (whose values are calculated by a Java™ class), iTopia views, and more. These will be described further below. The metadata definitions are stored in the Meta 170 database.

Once the metadata has been defined for a given application database, the iTopia framework 230 provides a generic implementation of many basic and advanced features, such as table queries, table maintenances, data validation, view customization, linking, etc. If particular business rules are required, they are added through a mechanism called "extension points". The iTopia framework 230 will apply extension logic at these precise points to allow the generic implementation to be supplemented with non-generic, or custom, business logic.

Extensions are Java™ classes containing business logic that applies to a specific business context, such as a particular table or field in a table. Extensions are dynamically loaded by the framework 230 based on a naming convention and a defined interface. Therefore, when iTopia 230 is validating data for a particular table, it will attempt to load a class whose name contains the table name and follows the naming convention. If a class with that name is found, it will invoke the appropriate method in it. The following is an example that illustrates this concept. An order entry system has an order table that represents orders. This table has a requested delivery date column that stores the date the customer requested the order be delivered. When a user enters orders into the system, generic iTopia validations will ensure that the value entered by the user is a valid date, however, custom business logic is required to ensure the value meets certain extra requirements, for example, that the date provided must be at least one day after the current date. This custom requested delivery date validation is supplied in an extension class.

There are extension points defined for field defaulting, formatting, validation, disabling, and for pre and post table inserts, updates, and deletes, to name a few. Each extension point has an application programming interface ("API") in the form of a Java™ interface class that defines what the extension can do at that particular point. The extension point API both enables and restricts the developer. It enables the injection of business logic, but it also restricts how and where and what business logic may be applied. It does so to ensure that the developer can easily do what the extension point was intended for, and cannot do something that the iTopia framework 230 does not expect and cannot handle.

Referring again to FIG. 4, the core 401 of iTopia 230 is located in the Enterprise Java Beans™ ("EJB") layer 400. The EJB layer 400 holds all of the business rules and it controls business flows such as the allocation of goods, order fulfillment, shipping, etc. The EJB layer 400 has a core or foundation layer 401 that consists of common routines and utilities, such as functions for logging, retrieving multi-lingual messages, accessing the metadata, security, connectivity to the databases, directory servers, triggers for the execution of a report which consists of sending a request to the BI server 163, etc. The core 401 of iTopia 230 implements the concept of application-level code extensions 402. One may think of code extensions as plug-ins. These are what hold the actual business logic for an application. Application-level code extensions 402 are kept separate by application or system such as the DMS 471, WMS 220, and TMS 473.

Layered on top of the business logic layer 400 (i.e., iTopia core 401 plus application-level code extensions 402) is the presentation layer 403 which is referred to as the Web application layer. This presentation layer 403 is responsible for the delivery and formatting of data provided by the business logic layer 400. It relieves the business logic layer 400 of concerns regarding syntactical differences in data representation within the end-user systems. iTopia 230 supports a presentation format for human consumption within a Web browser and a format for integration to and from an external system 167.

The presentation format for human consumption is referred to as the iTopia Web user interface ("WUI") 404. The presentation format for external systems is referred as the iTopia integration services 405. External systems 167 can integrate with iTopia through this presentation format. Two mechanisms are provided within iTopia integration services 405. They are web services 406 and queue-based services 407 which allow for, amongst other things, the exchange of extensible markup language ("XML") files.

According to one embodiment of the invention, there is provided a WMS application or system 220 that delivers dynamically-generated visual instructions based on contextual data to an operator or user that allows the operator or user to interact with the computerized WMS on a wireless device 161. The architecture (or system) 100 allows administrators to create their own set of images based on live data and calculated expressions.

According to one embodiment, there is provided an application (i.e., Visual Logistics) 210 that presents visual information combined with traditional text-based information via wireless devices 161 used by operators at floor level of a warehouse. This approach is advantageous because prior WMS applications have generally relied upon difficult to read text-based instructions to assign work tasks to operators. As mentioned above, alternative technologies such as voice directed picking have been proposed, but no single solution has been developed to enable an operator to receive visual information across all work functions within the distribution center or warehouse. Visual Logistics 210 is advantageous as it improves efficiency because operators receive visual information to reduce the time required to find slot locations throughout the distribution center or warehouse. Visual Logistics 210 may increase task accuracy because it provides visual images of products and/or visual instructions to confirm the operator's work tasks. Examples of Visual Logistics 210 applications and how they benefit distribution operations are described in the following.

Visual Logistics 210 may be used to generate visual instructions for operators in a warehouse. Visual instructions provide the ability to interact with operators in a dynamic, context sensitive method for task instruction communications. This may replace both voice and textual information as dynamic images are faster to comprehend, less 'brain intensive', and results in higher task accuracy.

Examples of dynamic image-driven tasks that may take advantage of visual instructions include the following. First, an operator or user is instructed to capture a lot or serial number during receiving operations. In text form, the operator is instructed to enter the Lot ID. In visual form, the operator is presented with an animated image of the barcoded product label from the particular manufacturer of the product with a flashing circle around the specific barcode that contains the lot or serial number data. The image of the label matches exactly what the operator physically sees on the box in front of him/her. The label image on the display screen 340 coupled with the flashing circle of where to scan is the instruction to the operator to scan the noted position on the label. When a different item is scanned for a different manufacturer, a different image is presented that matches the second manufacturer's label. If no lot/serial number is to be scanned, then the label image is not presented to the operator.

Second, in text form, an operator is instructed to go to a specific warehouse bin location (e.g., 110103C) and pick a quantity of "boxes". The operator must "decode" the bin location name to understand it represents a specific aisle, bay, shelf, and position (e.g., aisle 11, bay 1, shelf 3, and position A). The operator then must determine what a "box" is when he/she finds a brown cardboard box with smaller box boxes inside it. In visual form, the operator is shown a color coded aisle and bay, and an image for the full bay (i.e., multiple shelfs, multiple positions, etc.) with the target shelf and position uniquely highlighted on the display screen 340 of his/her wireless device 161, 300. An image of the proper "box" is also shown so the operator immediately recognizes if the inner white box, or the outer brown box, is to be picked.

Third, an operator is picking six sales orders simultaneously (i.e., "cluster picking" in industry terminology) and after picking the correct item and quantity is instructed as to which picking tote among the six on his/her cart to put the product into (i.e., each tote being a different customer's order). In text form, the operator is instructed to put the quantity into "Tote 2 of 6" or into "Tote 154320654" if the tote as a physical label. In visual form, the operator is presented with a dynamic image of the cart and six totes and the proper tote is highlighted. The operator matches the position of the tote with the one on his instructional screen 340 and does not need to read (or worse remember) tote numbers to find the correct tote. Since the number of totes on the cart and the position of each tote is dynamic, and since the application 210 dynamically highlights the proper tote, the operator is assured he/she is being directed to the proper one so that orders are not mixed up.

From the above examples, the following benefits of the dynamic visual instructions are apparent. First, operators are faster at identifying what is to be performed. Studies have shown that the human brain is much faster in matching images than comprehending text. Second, fewer mistakes are made due to elimination of language confusions and literacy issues as images are "language and literacy independent". Third, mistakes caused by string transpositions are eliminated (e.g., the difference between 11010110 and 11011010). Fourth, operators are less fatigued as energy for concentration is reduced during long work shifts (and much reduced over voice instructions). Fifth, operations improve performance by using dynamic images that best match their specific operational challenges, products, and environments without the requirement for additional software customization. Sixth, exception conditions are not missed as operators can be specifically notified of the exceptions in real-time (e.g., hazardous material involved) in a graphical form that ensures the operator's attention is captured and maintained.

iTopia 230 provides within its capabilities a toolset that enables visual instructions. It starts off with the metadata already having been predefined for the target application that one wishes to develop visual instructions for (e.g., the warehouse management system 220). One then augments it using the following feature set/capabilities: expression columns; render extensions; and, view personalization. These capabilities will be described in the following.

Expression columns enable users and system administrators to define calculated values to be used in application views. Expression columns are defined as new entries in the metadata that define the columns (i.e., fields) available for an application table. The formula/expression is specified for it and uses hard-coded values, operands, functions, and processing instructions. The expression column's value is at runtime.

In column processing instructions, one can include fields from related tables as long as the relation between these tables is marked as identifying. An identifying relation is one where the existence of a row in the child table depends on a row in a parent table. This occurs when one makes the foreign key to the parent table part of the child table's primary key. An example of this is a sales order header and sales order line item table. As a result, for example, if one is adding an expression column to the sales order line table, one can use a field from the sales order header table.

An expression can be comprised of the following: (a) Column placeholders. Used for columns in the current table, parent-maintained table, or any ancestry table. Example: {column.table_name.column_name}; (b) String concatenation. Two pipe symbols are used for this purpose (||); (c) Math operators (i.e., + Addition; − Subtraction; * Multiplication; / Division); and, (d) Math functions (i.e., Round: Round (value, decimal precision). Rounds the value to a specific precision; Abs: Abs(value). Converts the value to the absolute value; safe.divide: safe_divide (dividend, divisor). Performs a safe division. When the divisor is 0, returns 0, otherwise returns the quotient (dividend divided by divisor); and, Parentheses).

The following are examples of the above. First, to round the value to 2 decimal place precision, one would have the following:

round({column.item_w.cust_orders}+{column.item_
w.tfer_out}+{column.item_w.issued}, 2)

Second, to round the number to 2 decimal places and absolute the number, one would have the following:

abs(round({column.item_w.cust_orders}+{colum-
n.item_w.tfer_out}+{column.item_w.issued}, 2))

Third, to represent the formula for the dms.cust_hist.margin expression column, one would have the following:

round(safe_divide({column.cust_hist.sales_amt}−
{column.cust_hist.cost_amt}, {column.cust_hist,
cost_amt}), 2)*100

Fourth, to concatenate the item number (item_num) and the warehouse code (whse_code) separated by the pipe symbol (|), one would have the following:

{column.item_w.item_num}||'|'||{column.item_w.whse_code}

In addition to the above, it is possible to include in an expression column definition a structured query language ("SQL") select statement or a function call to a stored procedure that will retrieve values from a non-identifying related table. The result of either the SQL select statement or the stored procedure would have to return a single value only.

The following are examples of the above. First, to get the area location's total quantity on a command queue record, one would have the following:

(select sum (qty) from iv_f where
    iv_f.loc={column.cm_f.dest} and
    iv_f.sku={column.cm_f.sku} and
    iv_f.pkg={column.cm_f.pkg})

Second, to call a stored procedure to get the pallet count for an inbound order, one would have the following:

get_pallet_count({column.ibod_f.sku}, {column.ibod-
_f.pkg}, {column.ibod_f.ord_qty})

Column placeholders can be used within the defined SQL statement or stored procedure call. These get substituted at runtime with their current values prior to executing the SQL. The same restrictions apply here with regards to the columns that can be included as above (from identifying relations only).

It is also possible to include in the SQL statement objects from another database or schema. Typical objects are tables, views, and stored functions. The proper syntax to use is: {dbobject.databaseName.objectName}.

The following is an example of the above. To get the French text from the meta database's literals table (md_locale_text) on a view off of a DMS database table (message) one would have:

(select lit_text from {dbobject.meta.md_locale_text} where lit_key = {column.message.lit_key} and locale_key = 'fr_CA')

An expression column's default value is validated when maintained. Invalid table column, session attribute, today, and current processing instructions are trapped, as well as invalid SQL syntax. If there is a problem, an error message is displayed.

Render extensions allow one to add any hypertext markup language ("HTML") code to any field value. As a result, one has the ability to customize the display of any field value to one's needs. The capability is provided for various elements of the user interface (i.e., search results sets and detail pages).

Render extensions can apply at the domain level or at the column level. A domain refers to all the unique values which a data element or column may contain. One can think of a domain as a logical data type. Columns defined in the metadata generally always reference a domain. The domain would then define the column's data type along with other information such as its enumerated list of values. If a render extension applies at the domain level, then all columns that share that domain will be affected.

To set up a render extension, one would do the following. First, add a record to the "Domain—Attribute" or the "Column—Attribute" table. Second, enter one of the following attribute keys: (a) render.html.grid—to apply render extensions to the result set grid; (b) render.html.row—to apply render extensions to the details page; (c) render.ce.grid—to apply render extensions to the result set grid displayed on a Windows™ C/E screen; (d) render.ce.row—to apply render extensions to the details page displayed on a Windows™ C/E screen; (e) render.ppc.grid—to apply render extensions to the result set grid displayed on a Pocket PC™ screen; and, (f) render.ppc.row—to apply render extensions to the details page displayed on a Pocket PC™ screen. Third, enter an attribute value, which is an actual HTML code snippet that gets placed within the table cell (<TD></TD> tags) of the resulting page. Placeholder values may be placed within this HTML code snippet. They include the following: (a) {content}—This placeholder represents the HTML that is generated by iTopia 230. One can specify additional HTML to be placed before, after, or both before and after the content generated; (b) {valuen}—This placeholder represents the value of the column for the current row. If there is only one value, then there is no need to specify a numeric identifier. When the field contains several value parts, then it is necessary to identify each with an ascending numeric identifier (e.g., {value1}, {value2}, {value3}, and so on). Note that it will be necessary to separate each value part in the column table with the pipe symbol (|). Also note that any leading or trailing blanks are trimmed from any value or value part at run-time; (c) {literal.litkey}—In this case, the specified litkey is replaced with the localized text based on the current user session's locale. Several literals can be specified in a single record. Example: Assuming that {literal.cust} is entered, if the user's session locale is set to en_US, then the selected localized text is Customer; if the session locale is set to fr_CA, then the text is Client; and, (d) {environment-variable-name}—Where environment variable includes any properties setting that begins with "sums.environment". Here are some of the more widely used settings: dms.base_url, wms.base_url, portal.home_url, resource.system.base_url.

The following are examples of the above. First, to display an image to show if the user is active or inactive to allow one to more easily see active or inactive users, one would have the following:

```
<img class="ImageLeft"
src="{resource.system.base_url}/meta/_domain/is_active/{value}.gif"
/>{content}
```

Second, to create a Javascript function that launches the resource name displayed, a Go image with a hyperlink is displayed; and one would have the following:

```
{content}<span class="padLeft"><a style="align=right"
href="javascript:parent.CommonMethods_launchResource('{value}')"><img
src="{resource.user.base_url}/meta/_domain/resource_name/go.gif" /></a></span>
```

Third, where the expression column contains two value parts to show how to implement a uniform resource locator ("URL") with a different title, one would have the following:

```
<a href="{value1}">{value2}</a>
```

With respect to view personalization, EliteSeries 220 may be delivered with over one thousand predefined views spanning the products built using the iTopia framework (DMS, WMS, and TMS) 230. These views can be maintained and modified by the administrator as well as individual users, so that each person can focus on exactly the type of information that is relevant to them.

Each user can customize the data elements included in the search criteria of any given view. One user may want to retrieve order data by specifying a particular date range because they know the order was placed within a particular time period. Another user may choose to retrieve order data using the customer's purchase order number. The flexibility of EliteSeries 230 allows each individual user to tailor the view content based on their own unique job requirements.

Personalizing views to suit their own needs is provided. When using EliteSeries views, a personalize action is available in the lower-right corner of the browser window. A user clicks it to access information on four critical areas of personalization: "Search Criteria", "Search Results", "Sorting", and "Details". The personalization dialog is divided mainly into two parts: the available fields to include in one's display; and, the order in which one wishes to display the fields. Since the number of fields to choose from can number in the hundreds, the ability to filter out those fields is available, either by entering the text one is looking for in a "Show Only Fields Containing" field, or by selecting an "Exclude Related Fields" option.

Users can define corporate-wide personalization without altering the generic views themselves. This gives the user the ability to restore its corporate-wide personalization to factory defaults if required. This simplifies the upgrade process, as no corporate-wide personalization is destroyed and only factory defaults are updated. The three layers of view ownership are as follows: Default (i.e., generic "out-of the-box" views; contain factory default settings; belong to the user "default"; may not be overridden; may be restored at any time); System (i.e., optional; represent a company's adaptation of the generic default views through personalization; contain corporate-wide personalization settings; belong to the user "system"); and, User (i.e., optional; represent a specific user's adaptation of a view through personalization; default (or are derived) from the views owned by the user "system", or in their absence, from the generic default user views).

In the following, an example Visual Logistics 210 implementation of visual instructions is provided in accordance with an embodiment of the invention. Consider the following scenario. A warehouse worker or user operating a wireless device 161, 300 is picking six orders simultaneously. Each order is in a separate box. The objective is ensure that the picker or user will place the item picked into the correct box (depicted visually using an image displayed on the displace screen 340 on the wireless device 161, 300). The steps involved in the implementation are as follows.

First, a WMS 220 Command Queue table (cm_f) defines all of the tasks to be performed by workers or users on the warehouse floor. These include picks, stores, replenishments, cycle counts, and other tasks. The metadata for this table defines all of its fields and attributes. A subset of these that are relevant to what is to be implemented here and include the following: Current Cart. Container Position (cart_act); Starting Cart Container Position (cart_beg); and, Ending Cart Container Position (cart_end).

Second, expression columns enable users and system administrators to define calculated values to be used in application views. Expression columns are defined as new entries in the metadata that define the columns (i.e., fields) available for an application table. The formula/expression is specified for it and uses hard-coded values, operands, functions and processing instructions. For this example, an expression column is created for the WMS Command Queue table (cm_j). It concatenates the three physical columns listed above: {column.cm_f.cart_beg},||'-'||{columnem_f.cart_act}||'-'{column.cm_f.cart_end}

Third, render extensions allow a user to add any HTML code to any field value. As a result, a user has the power to customize the display of any field value to their needs. For this example, a column rendering extension is defined for this new expression column with the following value:

```
<img class="ImageRight"
src="{resource.user.base_url}/wms/cm_f/cluster_position_image/{value}.gif"/>
```

Fourth, images for this new expression column are saved behind a predefined directory within the HTTP server (i.e., http-server-doc-dir/wms/cm_f/cluster_position_image).

Figure 5:
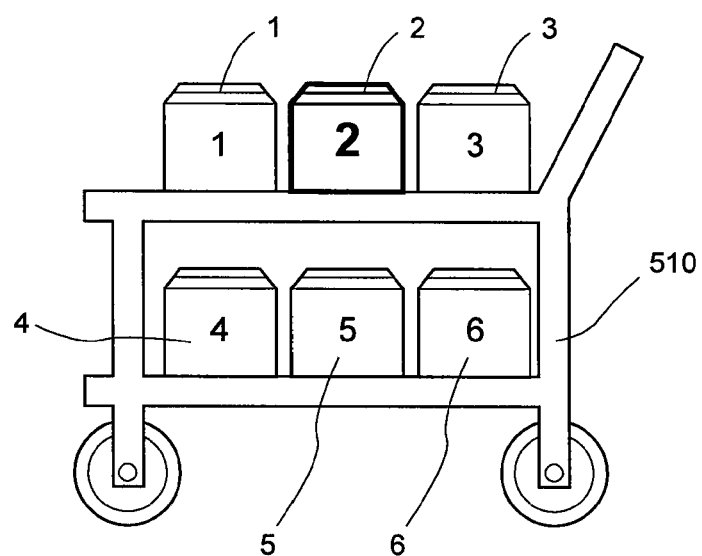
FIG. 5 is a screen capture illustrating a cart presentation in accordance with an embodiment of the invention.

FIG. 5 shows an example image. In particular, FIG. 5 is a screen capture illustrating a cart presentation 500 in accordance with an embodiment of the invention. The cart presentation 500 includes a representation of a cart 510 upon which is placed representations of various boxes 1, 2, 3, 4, 5, 6. One box 2 is highlighted in FIG. 5.

Figure 6:
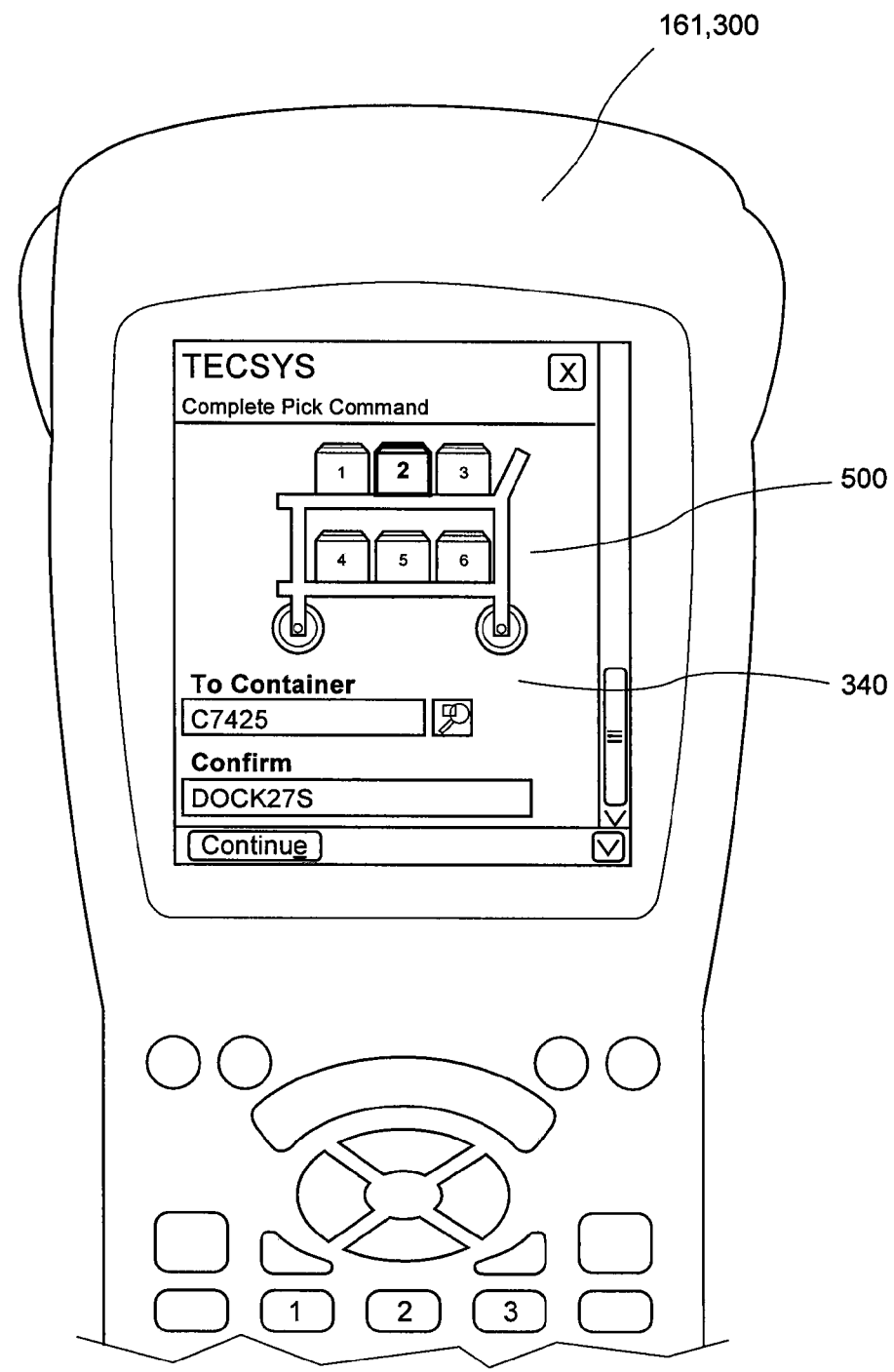
FIG. 6 is a partial front view illustrating a wireless device having a presentation displayed on its display screen in accordance with an embodiment of the invention.

Fifth, an iTopia view is a collection of data elements (as was defined in the metadata) used for a given context. Application contexts include searching for data, editing data, workflow definitions, etc. A predefined iTopia view off of the WMS Command Queue table is personalized to include this new expression column in the detail page at the top. This iTopia view is used as part of system directed pick workflow. In that context, the end result when presented on the display screen 340 of a user's wireless device 161, 300 would appear as shown in FIG. 6. In particular, FIG. 6 is a partial front view illustrating a wireless device 161, 300 having a presentation 500 displayed on its display screen 340 in accordance with an embodiment of the invention. The presentation 500 displayed on the display screen 340 represents a visual instruction for the user (e.g., "Complete Pick Command").

In the following, a method of dynamic image rendering according to one embodiment of the invention will be described. The warehouse includes many components, items, or containers that share similar characteristics: dimensions (i.e., width, depth, and height), weight, thickness, color, etc. The component list includes, but is not limited to, locations, containers, areas, aisles, shelves, packaging, equipment, items, etc. Taking and storing an image of each type of component, item, or container is not always feasible as there may be hundreds or thousands of them.

Each type of component, item, or container may be categorized into one of several classes. For example, containers may be categorized (or classified) as boxes, envelopes, totes, pallets, carts, etc. All boxes of a certain shape and color (e.g., brown parallelepiped) can be displayed using one image with some of the distinguishing characteristics dynamically overlaid on top of it.

Dynamic image rendering in accordance with an embodiment of the invention is achieved by creating expression columns that combine a component's image class with its characteristics (e.g., dimensions, weight, color, etc. . . . ). The application then generates HTML code using these values, an image from a library of stock images, and style sheets. A separate rendering template or style sheet can be used on different display devices. This can be extended further by changing the image perspective or viewing angle. FIG. 7 is a table 700 illustrating the display of width and depth of a box in different colours (e.g., blue and green) on top of an image in accordance with an embodiment of the invention.

Figure 9:
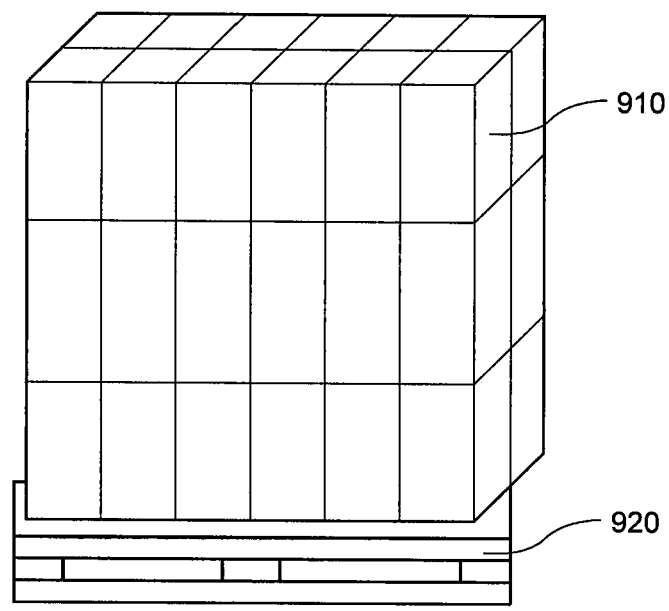
FIG. 9 is a screen capture illustrating a pallet item or container presentation in accordance with an embodiment of the invention.
Figure 10:
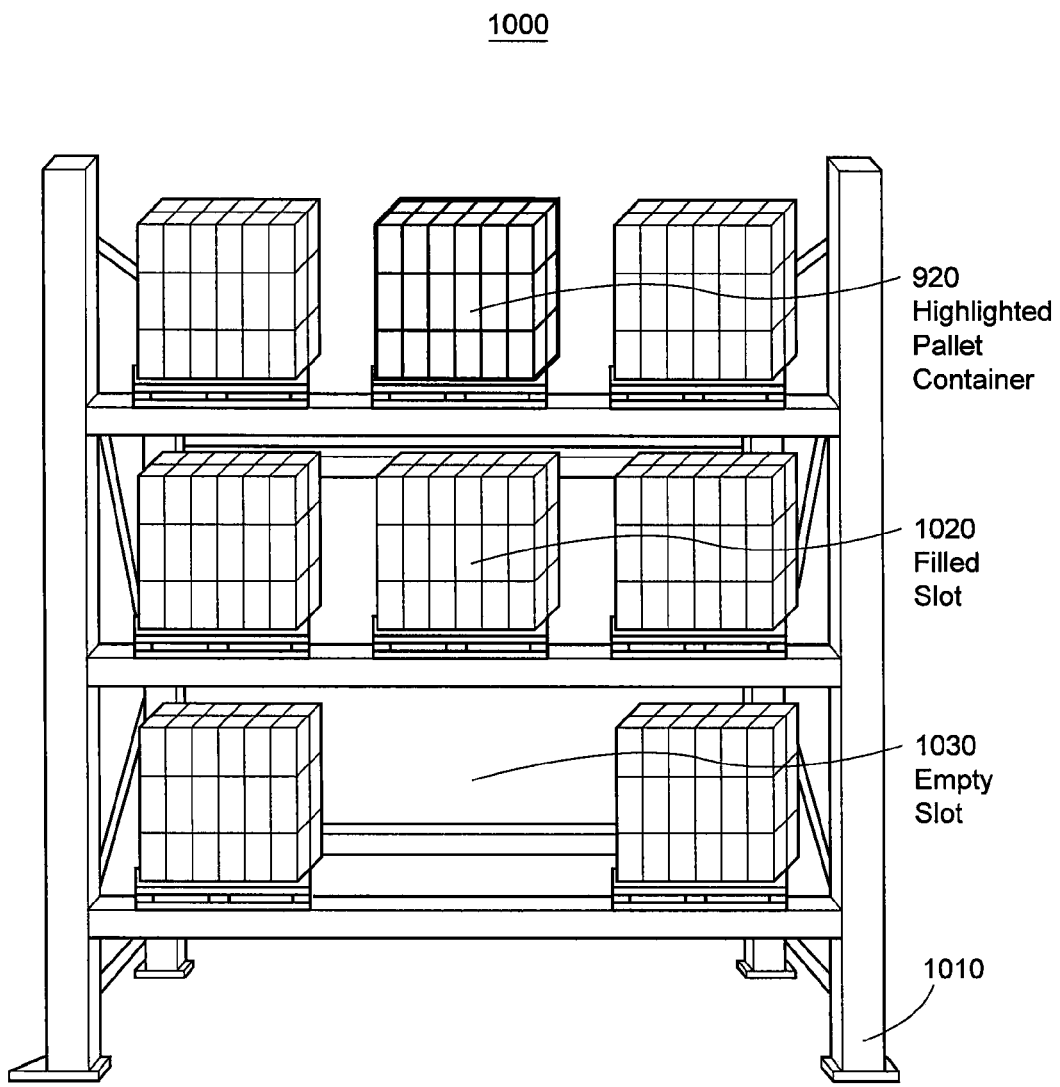
FIG. 10 is a screen capture illustrating a shelf with multiple pallet items or containers presentation in accordance with an embodiment of the invention; and, FIG. 11 is a flow chart illustrating operations of modules within a warehouse management system for providing instructions to a user, in accordance with an embodiment of the invention.

FIG. 8 is a table 800 illustrating various dynamic item or container images 820, classes 810, and data 830 in accordance with an embodiment of the invention. FIG. 9 is a screen capture illustrating a pallet item or container presentation 900 in accordance with an embodiment of the invention. And, FIG. 10 is a screen capture illustrating a shelf with multiple pallet items or containers presentation 1000 in accordance with an embodiment of the invention.

The concept can be further extended by allowing metadata based definitions of widget classes. For example, define a "product package" class containing dimensions, background image, overlay text, etc. Define a "cart" or "pallet" item or container class containing dimensions, background image, base image, one or more "slot" images, etc. A "product package" 910 is then placed in the "cart" or on a "pallet" item or container 920 at a certain "slot" (location/position). Additional attributes and behaviour can be attached to the highlighted "product package" (e.g., highlight color, overlay image, overlay text, pointer, etc.). Define a "shelf" class containing dimensions, background image, base image, one or more "slot" images, etc. A "pallet container" 920 is then placed 1020 on the "shelf" 1010 at a certain "slot" (location/position) 1030. Additional attributes and behaviour can be attached to the highlighted "pallet container" 920 (e.g., highlight color, overlay image, overlay text, pointer, etc.). The metadata allows for the definition of such widget classes. A rendering toolkit is provided and is responsible for the dynamic display of these widgets using user specific data. Existing widget classes can be extended by adding new attributes or new behaviour. Additional widget classes and rendering methods can be defined as well. The personalization component allows the user to control which widgets are used and their layout.

Aspects of the above described method may be summarized with the aid of a flowchart.

Figure 11:
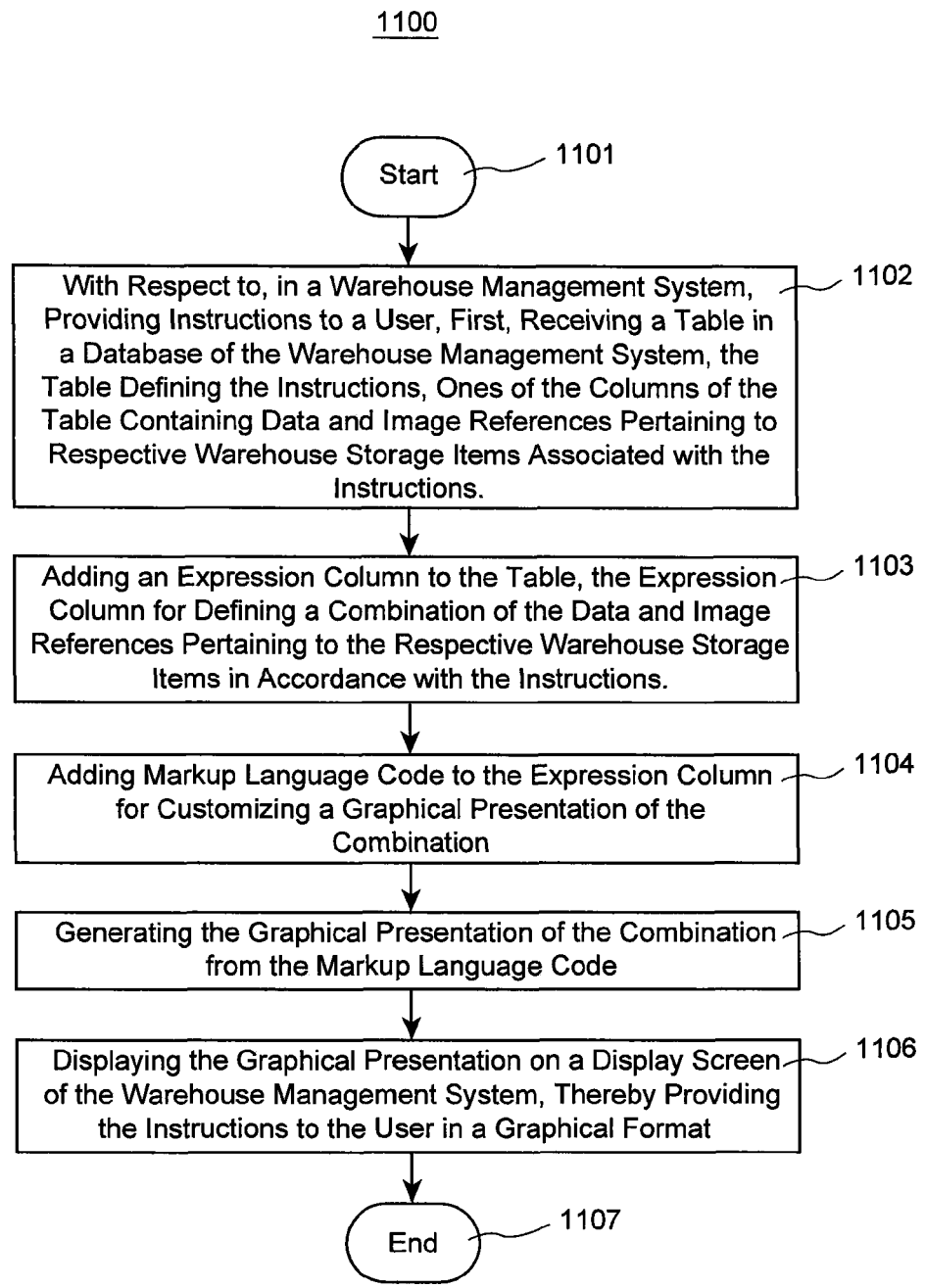

FIG. 11 is a flow chart illustrating operations 1100 of modules 321, 331 within a warehouse management system (e.g., 300) for providing instructions to a user, in accordance with an embodiment of the invention.

At step 1101, the operations 1100 start.

At step 1102, a table is received in a database (e.g., 332) of the warehouse management system 300, the table defining the instructions, one or more of the columns of the table containing data and image references (e.g., 830, 820) pertaining to respective warehouse storage items associated with the instructions.

At step 1103, an expression column is added to the table, the expression column for defining a combination (e.g., 1, 2, 3, and 510) of the data and image references 830, 820 pertaining to the respective warehouse storage items in accordance with the instructions.

At step 1104, markup language code (e.g., 710) is added to the expression column for customizing a graphical presentation 500 of the combination 1, 2, 3, 510.

At step 1105, the graphical presentation 500 of the combination 1, 2, 3, 510 is generated from the markup language code 710.

At step 1106, the graphical presentation 500 is displayed on a display screen 340 of the warehouse management system 300, thereby providing the instructions to the user in a graphical format.

At step 1107, the operations 1100 end.

The above method may further include highlighting at least one warehouse storage item (e.g., 2) in the graphical presentation 500 to illustrate a step of the instructions to the user. The columns of the table and the expression column may be defined by metadata. The display screen 340 may be a display screen 340 of a wireless device 161. The markup language code 710 may be hypertext markup language ("HTML") code 710. The data 830 pertaining to the warehouse storage items may include one or more of dimensions, weight, and colour thereof. The image references 820 pertaining to the warehouse storage items may include reference to images stored in a library. The graphical presentation 500 may be generated from the markup language code 710, the data 830, the image references 820, and one or more style sheets 720. The warehouse storage items may include classes 810 of items. The classes 810 may include one or more of warehoused items, containers, storage spaces, boxes, envelopes, totes, pallets, carts, and shelves. The warehouse storage items may be warehouse storage containers. The image references 820 may be user defined. The method may further include generating the table from an initial table defining the instructions in a textual format by adding the image references 820 thereto. And, the method may further include updating the database 332 of the warehouse management system 300 in accordance with the instructions upon completion thereof.

According to one embodiment, each of the above steps 1101-1107 may be implemented by a respective software module 331. According to another embodiment, each of the above steps 1101-1107 may be implemented by a respective hardware module 321. According to another embodiment, each of the above steps 1101-1107 may be implemented by a combination of software 331 and hardware modules 321.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product according to one embodiment of the invention. This computer software product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

What is claimed is:

1. A method in a warehouse management system for presenting instructions, said method comprising:
    querying a database of said warehouse management system, said database comprising at least one table storing tasks, said at least one table comprising (a) at least one column storing values related to warehouse storage items associated with said stored tasks, said warehouse storage items defining at least one widget class, each widget class comprising slot information that defines a physical position in relation to a plurality of available physical positions provided by each said widget class, and (b) an expression column defined as a function of said values of said at least one column, said database further comprising a render expression associated with said expression column;
    in response to said query of said database, receiving a result corresponding to at least one task of said stored tasks, said result comprising a value of said expression column modified by said render expression, said value corresponding to said at least one task;
    using said received result to generate a graphical representation associated with said at least one task; and
    displaying said generated graphical representation on a display screen of said warehouse management system;
    wherein the warehouse management system comprises a rendering toolkit for dynamic display of said widget class using user specified data.

2. The method of claim 1 wherein said generated graphical representation comprises at least one highlighted graphical representation of a warehouse storage item illustrating a step of said at least one task.

3. The method of claim 1 wherein the columns of said at least one table and said expression column are defined by metadata.

4. The method of claim 1 wherein said display screen is a display screen of a wireless device.

5. The method of claim 1 wherein said render expression modifies said value of said expression column with markup language code.

6. The method of claim 1 wherein said values related to said warehouse storage items comprise values corresponding to one or more of dimension, weight, and colour thereof.

7. The method of claim 1 wherein said values related to said warehouse storage items comprise references to images stored in a library.

8. The method of claim 7 wherein said references to images stored in a library are user defined.

9. The method of claim 1 wherein said generated graphical representation is a function of markup language code, values corresponding to one or more of dimension, weight, and colour of said warehouse storage items, values comprising references to images stored in a library, and one or more style sheets.

10. The method of claim 1 wherein said warehouse storage items comprise one or more classes of items.

11. The method of claim 10 wherein said one or more classes of items comprise one or more of warehoused items, containers, storage spaces, boxes, envelopes, totes, pallets, carts, and shelves.

12. The method of claim 1 wherein said warehouse storage items comprise warehouse storage containers.

13. The method of claim 1 further comprising generating said at least one table from an initial table defining said stored tasks in a textual format, by adding image references thereto.

14. The method of claim 1 further comprising updating said database upon completion of said at least one task.

15. A warehouse management system for presenting instructions, said system comprising:
- a processor coupled to memory and a display screen; and,
- at least one of hardware and software modules within the memory and controlled or executed by the processor, the modules including:
- a module for querying a database of said warehouse management system, said database comprising at least one table storing tasks, said at least one table comprising (a) at least one column storing values related to warehouse storage items associated with said stored tasks, said warehouse storage items defining at least one widget class, each widget class comprising slot information that defines a physical position in relation to a plurality of available physical positions provided by each said widget class, and (b) an expression column defined as a function of said values of said at least one column, said database further comprising a render expression associated with said expression column;
- a module for, in response to said query of said database, receiving a result corresponding to at least one task of said stored tasks, said result comprising a value of said expression column modified by said render expression, said value corresponding to said at least one task;
- a module for using said received result to generate a graphical representation associated with said at least one task;
- a module for displaying said generated graphical representation on said display screen; and
- a rendering toolkit for dynamic display of said widget class using user specified data.

16. The system of claim 15 wherein said generated graphical representation comprises at least one highlighted graphical representation of a warehouse storage item illustrating a step of said at least one task.

17. The system of claim 15 wherein the columns of said at least one table and said expression column are defined by metadata.

18. The system of claim 15 wherein said display screen is a display screen of a wireless device.

19. The system of claim 15 wherein said render expression modifies said value of said expression column with markup language code.

20. The system of claim 15 wherein said values related to said warehouse storage items comprise values corresponding to one or more of dimension, weight, and colour thereof.

21. The system of claim 15 wherein said values related to said warehouse storage items comprise references to images stored in a library.

22. The system of claim 21 wherein said references to images stored in a library are user defined.

23. The system of claim 15 wherein said generated graphical representation is a function of markup language code, values corresponding to one or more of dimension, weight, and colour of said warehouse storage items, values comprising references to images stored in a library, and one or more style sheets.

24. The system of claim 15 wherein said warehouse items comprise one or more classes of items.

25. The system of claim 24 wherein said one or more classes of items comprise one or more of warehoused items, containers, storage spaces, boxes, envelopes, totes, pallets, carts, and shelves.

26. The system of claim 15 wherein said warehouse storage items comprise warehouse storage containers.

27. The system of claim 15 further comprising a module for generating said at least one table from an initial table defining said stored tasks in a textual format by adding image references thereto.

28. The system of claim 15 further comprising a module for updating said database upon completion of said at least one task.

29. A method in a warehouse management system for presenting instructions, said method comprising:
- querying a database of said warehouse management system, said database comprising at least one table storing tasks, said at least one table comprising (a) at least one column storing values related to warehouse storage containers associated with said stored tasks, said warehouse storage containers defining at least one widget class, each widget class comprising slot information that defines a physical position in relation to a plurality of available physical positions provided by each said widget class, and (b) an expression column defined as a function of said values of said at least one column, said database further comprising a render expression associated with said expression column;
- in response to said query of said database, receiving a result corresponding to at least one task of said stored tasks, said result comprising a value of said expression column modified by said render expression, said value corresponding to said at least one task;
- using said received result to generate a graphical representation associated with said at least one task;
- displaying said generated graphical representation on a display screen of said warehouse management system;
- wherein the warehouse management system comprises a rendering toolkit for dynamic display of said widget class using user specified data.

* * * * *